(12) United States Patent
Xu et al.

(10) Patent No.: US 11,593,596 B2
(45) Date of Patent: Feb. 28, 2023

(54) OBJECT PREDICTION METHOD AND APPARATUS, AND STORAGE MEDIUM

(71) Applicant: SHANGHAI SENSETIME INTELLIGENT TECHNOLOGY CO., LTD., Shanghai (CN)

(72) Inventors: Dan Xu, Shanghai (CN); Wanli Ouyang, Shanghai (CN); Xiaogang Wang, Shanghai (CN); Sebe Nicu, Shanghai (CN)

(73) Assignee: SHANGHAI SENSE TIME INTELLIGENT TECHNOLOGY CO., LTD., Shanghai (CN)

( * ) Notice: Subject to any disclaimer, the term of this patent is extended or adjusted under 35 U.S.C. 154(b) by 422 days.

(21) Appl. No.: 16/985,747

(22) Filed: Aug. 5, 2020

(65) Prior Publication Data

US 2020/0364518 A1  Nov. 19, 2020

Related U.S. Application Data

(63) Continuation of application No. PCT/CN2019/077152, filed on Mar. 6, 2019.

(30) Foreign Application Priority Data

May 4, 2018 (CN) .......................... 201810421005.X

(51) Int. Cl.
*G06K 9/62* (2022.01)
*G06N 3/08* (2023.01)
(Continued)

(52) U.S. Cl.
CPC ......... *G06K 9/6288* (2013.01); *G06K 9/6232* (2013.01); *G06N 3/08* (2013.01); *G06T 7/60* (2013.01); *G06V 20/64* (2022.01)

(58) Field of Classification Search
CPC .... G06K 9/6288; G06K 9/6232; G06V 20/64; G06N 3/08; G06T 7/60
See application file for complete search history.

(56) References Cited

U.S. PATENT DOCUMENTS 11,037,032 B2 * 6/2021 Abbott ................. G06N 20/10
2017/0076179 A1 3/2017 Martineau et al.
(Continued)

FOREIGN PATENT DOCUMENTS

CN  104217216 A  12/2014
CN  105701508 A  6/2016
(Continued)

OTHER PUBLICATIONS

Mousavian et al.; Joint Semantic Segmentation and Depth Estimation with Deep Convolutional Networks; Fourth Int'l Conf. on 3D Vision; 2016; p. 611-619.
(Continued)

*Primary Examiner* — Fayyaz Alam
(74) *Attorney, Agent, or Firm* — BakerHostetler

(57) ABSTRACT

The present application relates to an object prediction method and apparatus, an electronic device, and a storage medium. The method is applied to a neural network and includes: performing feature extraction processing on a to-be-predicted object to obtain feature information of the to-be-predicted object; determining multiple intermediate prediction results for the to-be-predicted object according to the feature information; performing fusion processing on the multiple intermediate prediction results to obtain fusion information; and determining multiple target prediction results for the to-be-predicted object according to the fusion information. According to embodiments of the present application, feature information of a to-be-predicted object may be extracted; multiple intermediate prediction results for the to-be-predicted object are determined according to the fea-
(Continued)

ture information; fusion processing is performed on the multiple intermediate prediction results to obtain fusion information; and multiple target prediction results for the to-be-predicted object are determined according to the fusion information. The method facilitates improving the accuracy of multiple target prediction results.

20 Claims, 16 Drawing Sheets

(51) Int. Cl.
*G06T 7/60* (2017.01)
*G06V 20/64* (2022.01)

(56) References Cited

U.S. PATENT DOCUMENTS

2017/0169315 A1 6/2017 Vaca Castano et al.
2018/0075290 A1 3/2018 Chen et al.
2019/0080456 A1* 3/2019 Song .................... G06V 10/82
2019/0228266 A1* 7/2019 Habibian ............. G06N 3/0445

FOREIGN PATENT DOCUMENTS

| CN | 106203318 A | 12/2016 |
|---|---|---|
| CN | 106845549 A | 6/2017 |
| CN | 107704866 A | 2/2018 |
| CN | 107958216 A | 4/2018 |
| CN | 107967451 A | 4/2018 |
| CN | 108108657 A | 6/2018 |
| WO | WO 2017/015390 A1 | 1/2017 |

OTHER PUBLICATIONS

International Patent Application No. PCT/CN2019/077152; Int'l Search Report; dated Jun. 14, 2019; 2 pages.

\* cited by examiner

OBJECT PREDICTION METHOD AND APPARATUS, AND STORAGE MEDIUM

The present application is a continuation of and claims priority under 35 U.S.C. § 120 to PCT Application. No. PCT/CN2019/077152, filed on Mar. 6, 2019, which claims priority to Chinese Patent Application No. 201810421005.X, filed with the Chinese Patent Office on May 4, 2018 and entitled "OBJECT PREDICTION METHOD AND APPARATUS, ELECTRONIC DEVICE, AND STORAGE MEDIUM". All the above referenced priority documents are incorporated herein by reference in their entirety.

TECHNICAL FIELD

The present application relates to the field of computer technologies, and in particular, to an object prediction method and apparatus, an electronic device, and a storage medium.

BACKGROUND

With the rapid development of deep learning technology, a neural network may be applied to various types of object prediction tasks. However, in the related art, when multiple targets are predicted simultaneously, the accuracy of obtained multiple target prediction results is low.

SUMMARY

In this regard, the present application provides technical solutions for object prediction.

An object prediction method provided according to one aspect of the present application is applied to the neural network, and the method includes:

performing feature extraction processing on a to-be-predicted object to obtain feature information of the to-be-predicted object; determining multiple intermediate prediction results for the to-be-predicted object according to the feature information; performing fusion processing on the multiple intermediate prediction results to obtain fusion information; and determining multiple target prediction results for the to-be-predicted object according to the fusion information.

An object prediction method provided according to another aspect of the present application is applied to the neural network, and the method includes:

inputting a to-be-predicted object into a feature extraction network in the neural network for feature extraction processing to obtain feature information of the to-be-predicted object; determining multiple intermediate prediction results for the to-be-predicted object by inputting the feature information into a first prediction network in the neural network for processing; inputting the intermediate prediction results into a fusion network in the neural network for fusion processing to obtain fusion information; determining multiple target prediction results for the to-be-predicted object by inputting the fusion information into multiple second prediction networks in the neural network for processing respectively; determining a model loss of the neural network according to the multiple intermediate prediction results, annotation information of the multiple intermediate prediction results, the multiple target prediction results, and annotation information of the multiple target prediction results; and adjusting a network parameter value of the neural network according to the model loss.

An object prediction apparatus provided according to another aspect of the present application is applied to the neural network, and the apparatus includes:

a feature extraction module, configured to perform feature extraction processing on a to-be-predicted object to obtain feature information of the to-be-predicted object;

an intermediate prediction result determination module, configured to determine multiple intermediate prediction results for the to-be-predicted object according to the feature information;

a fusion module, configured to perform fusion processing on the multiple intermediate prediction results to obtain fusion information; and a target prediction result determination module, configured to determine multiple target prediction results for the to-be-predicted object according to the fusion information.

An object prediction apparatus provided according to another aspect of the present application is applied to the neural network, and the apparatus includes:

a first information obtaining module, configured to input a to-be-predicted object into a feature extraction network in the neural network for feature extraction processing to obtain feature information of the to-be-predicted object;

a first result determination module, configured to determine multiple intermediate prediction results for the to-be-predicted object by inputting the feature information into a first prediction network in the neural network for processing;

a second information obtaining module, configured to input the intermediate prediction results into a fusion network in the neural network for fusion processing to obtain fusion information;

a second result determination module, configured to determine multiple target prediction results for the to-be-predicted object by inputting the fusion information into multiple second prediction networks in the neural network for processing respectively;

a model loss determination module, configured to determine a model loss of the neural network according to the multiple intermediate prediction results, annotation information of the multiple intermediate prediction results, the multiple target prediction results, and annotation information of the multiple target prediction results; and a parameter adjustment module, configured to adjust a network parameter value of the neural network according to the model loss.

An electronic device provided according to another aspect of the present application includes: a processor; and a memory configured to store processor-executable instructions; where the processor is configured to execute the object prediction method.

A computer-readable storage medium provided according to one aspect of the present application has computer program instructions stored thereon, where when the computer program instructions are executed by a processor, the object prediction method is implemented.

A computer program provided according to another aspect of the present application includes a computer readable code, where when the computer readable code runs in an electronic device, a processor in the electronic device executes instructions for implementing the object prediction method.

According to embodiments of the present application, feature information of a to-be-predicted object may be extracted; multiple intermediate prediction results for the to-be-predicted object are determined according to the feature information; fusion processing is performed on the multiple intermediate prediction results to obtain fusion information; and multiple target prediction results for the to-be-predicted object are determined according to the fusion information. The method facilitates improving the accuracy of the multiple target prediction results.

The other features and aspects of the present application may be described more clearly according to the detailed descriptions of the exemplary embodiments in the accompanying drawings.

BRIEF DESCRIPTION OF THE DRAWINGS

The accompanying drawings included in the specification and constituting a part of the specification illustrate the exemplary embodiments, features, and aspects of the present application together with the specification, and are used for explaining the principles of the present application.

DETAILED DESCRIPTION

The various exemplary embodiments, features, and aspects of the present application are described below in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The special term "exemplary" here means "used as an example, an embodiment, or an illustration". Any embodiment described as "exemplary" here is not necessarily to be interpreted as superior to or better than other embodiments.

In addition, numerous details are given in the following detailed description for the purpose of better explaining the present application. It should be understood by persons skilled in the art that the present application can still be implemented even without some of those details. In some of the examples, methods, means, elements, and circuits that are well known to persons skilled in the art are not described in detail so that the principle of the present application becomes apparent.

Figure 1:
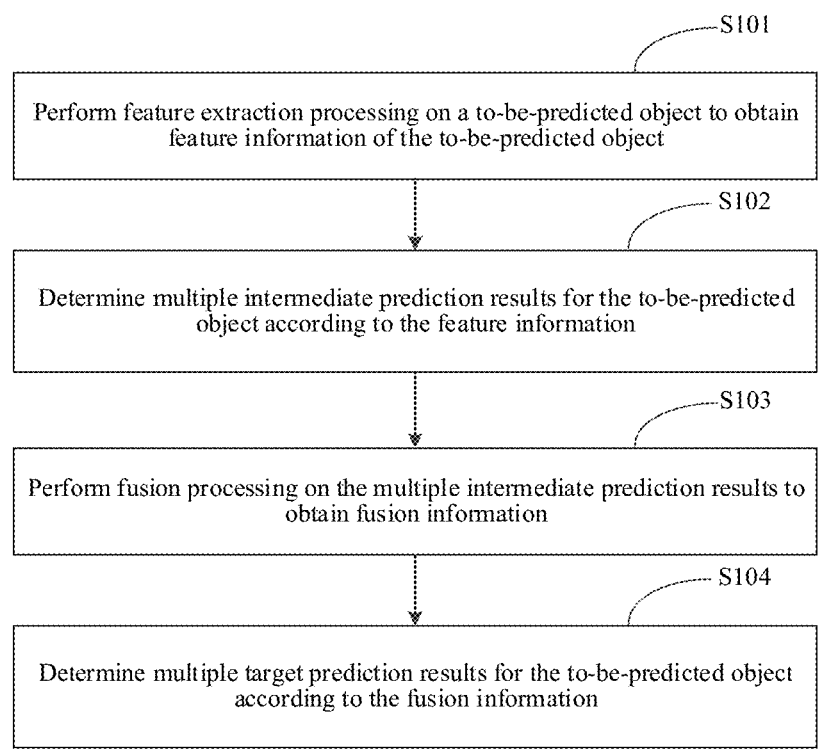
FIG. 1 is a flowchart of an object prediction method according to an exemplary embodiment.

FIG. 1 is a flowchart of an object prediction method according to an exemplary embodiment. The method may be applied to an electronic device. The electronic device may be provided as a terminal, a server, or other forms of devices. As shown in FIG. 1, the object prediction method according to the embodiments of the present application includes the following steps.

At step S101, feature extraction processing is performed on a to-be-predicted object to obtain feature information of the to-be-predicted object.

At step S102, multiple intermediate prediction results for the to-be-predicted object are determined according to the feature information.

At step S103, fusion processing is performed on the multiple intermediate prediction results to obtain fusion information.

At step S104, multiple target prediction results for the to-be-predicted object are determined according to the fusion information.

According to the embodiments of the present application, feature information of a to-be-predicted object may be extracted; multiple intermediate prediction results for the to-be-predicted object are determined according to the feature information; fusion processing is performed on the multiple intermediate prediction results to obtain fusion information; and multiple target prediction results for the to-be-predicted object are determined according to the fusion information. The method facilitates improving the accuracy of the multiple target prediction results.

In the related art, the deep learning technology may be applied to various types of object prediction tasks, for example, a depth estimation prediction task (depth estimation may provide three-dimensional information of a scene), a scene segmentation prediction task (scene segmentation may generate two-dimensional semantics of the scene) and the like. Object prediction may be widely applied to various important application fields, for example, depth estimation prediction and scene segmentation prediction may be applied to the application fields of intelligent video analysis, road scene modeling, automatic driving and the like.

In an actual use process, multiple targets may be required to be predicted simultaneously. For example, depth estimation and scene segmentation are performed on an image or sequence under a single camera simultaneously. However, in the process of predicting multiple targets simultaneously, multiple target prediction tasks may have significant differences, for example, depth estimation is a continuous regression problem, and scene segmentation is a discrete classification problem. The accuracy of multiple target prediction results for predicting multiple targets simultaneously is generally low, and the prediction performance is poor. Hence, the complexity for predicting multiple targets simultaneously is high. When predicting multiple targets simultaneously, how to improve the accuracy of the multiple target prediction results is an urgent problem.

In the embodiments of the present application, feature extraction processing may be performed on a to-be-predicted object to obtain feature information of the to-be-predicted object, and multiple intermediate prediction results for the to-be-predicted object are determined according to the feature information. The multiple intermediate prediction results may be intermediate prediction results of multiple levels (e.g., from a low level to a high level), thereby generating multi-modal data that may assist in determining final multiple target prediction results. Fusion processing is performed on the multiple intermediate prediction results to obtain fusion information, and multiple target prediction results for the to-be-predicted object are determined according to the fusion information. Compared with the method for directly determining multiple target prediction results of the to-be-predicted object, and improving the multiple target prediction results only on a final prediction layer by interacting, or directly obtaining the multiple target prediction results by using a model obtained by a joint optimization objective function through training, in the embodiments of the present application, the multiple intermediate prediction results determined according to the to-be-predicted object are used for assisting in determining final multiple target prediction results. The method facilitates improving the accuracy of the multiple target prediction results.

It should be understood that the embodiments of the present application may be applied to various multi-task prediction, for example, RGB-D behavior recognition, multi-sensor intelligent video monitoring, depth estimation and scene segmentation dual-task prediction and the like. The neural network may be trained with a to-be-predicted object. The to-be-predicted object may be various types of images, such as RGB image, which is not limited in the present application. The multiple intermediate prediction results of the to-be-predicted object may include target prediction results and may also be related to or complementary to the multiple target prediction results. The corresponding relation between the multiple intermediate prediction results and the multiple target prediction results, the number of the intermediate prediction results, the number of the target prediction results and the like are not limited in the present application. For ease of illustration, the to-be-predicted object is an RGB image, the intermediate prediction results include a depth estimation intermediate prediction result, a curved surface normal intermediate prediction result, a contour intermediate prediction result, and a semantic segmentation intermediate prediction result, and the target prediction results include a depth estimation result and a scene segmentation result, which are taken as examples for description.

For example, feature extraction processing is performed on a to-be-predicted object (e.g., a single RGB image) to obtain feature information of the to-be-predicted object. For example, the to-be-predicted object is input into a feature extraction network in the neural network for feature extraction processing to obtain feature information of the to-be-predicted object, where the feature extraction network may include various convolutional neural networks. For example, the feature extraction network may use one of an Alex Net network structure, a VGG network structure, and a ResNet network structure, which is not limited in the present application.

Figure 2:
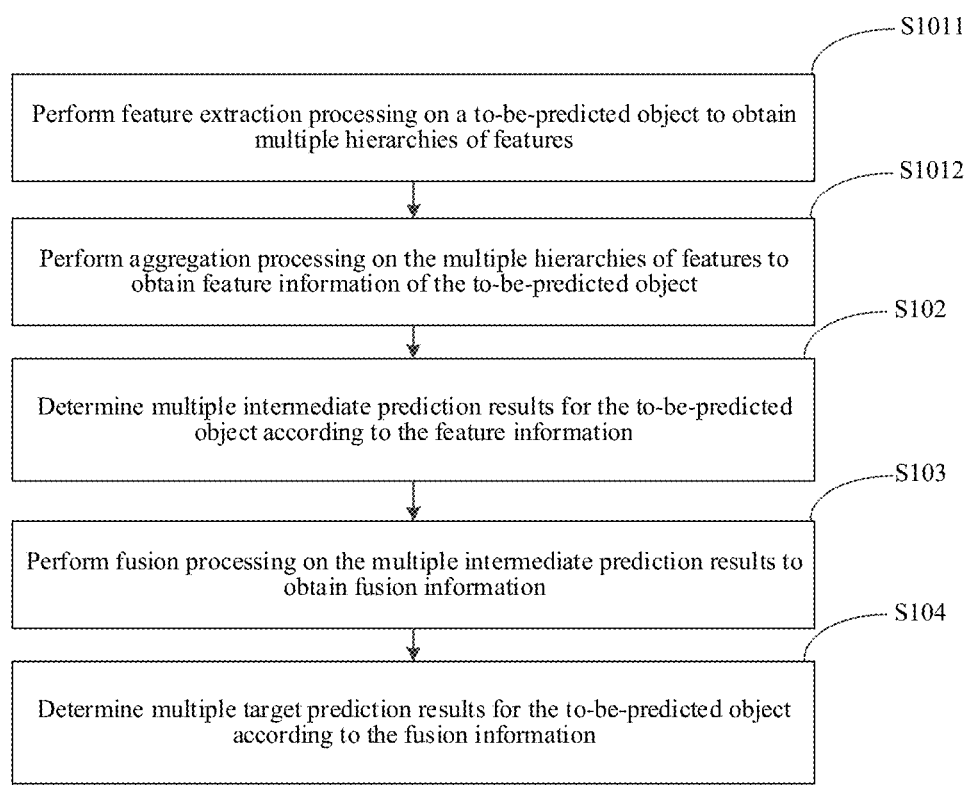
FIG. 2 is a flowchart of an object prediction method according to an exemplary embodiment.
Figure 3:
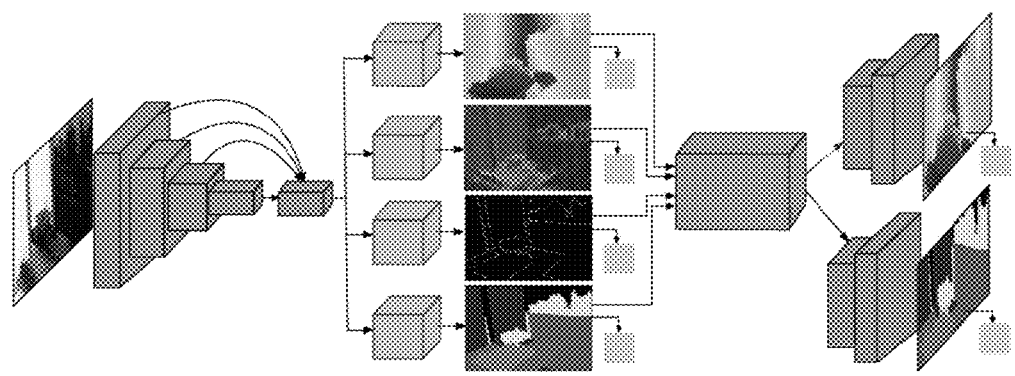
FIG. 3 is a schematic diagram of an application scene of an object prediction method according to an exemplary embodiment.

FIG. 2 is a flowchart of an object prediction method according to an exemplary embodiment. FIG. 3 is a schematic diagram of an application scene of an object prediction method according to an exemplary embodiment. In one possible implementation, as shown in FIG. 2, step S101 may include the following steps.

At step S1011, feature extraction processing is performed on a to-be-predicted object to obtain multiple levels of features.

At step S1012, aggregation processing is performed on the multiple levels of features to obtain feature information of the to-be-predicted object.

For example, feature extraction processing is performed on a to-be-predicted object, for example, feature extraction processing is performed on the to-be-predicted object through a feature extraction network comprising a convolutional neural network. The convolutional neural network may include multiple stages of convolution layers, e.g., a first-stage convolution layer to an Nth-stage convolution layer, and each stage of convolution layer may include one or more convolution sub-layers. By performing feature extraction processing on the to-be-predicted object, multiple levels of features may be obtained (for example, determining a feature of the last convolution sub-layer in each stage of convolution layer as the feature of each level). For example, as shown in FIG. 3, features of four levels are obtained.

In one possible implementation, when feature extraction processing is performed on the to-be-predicted object through a feature extraction network comprising a convolutional neural network, a receptive field of convolution may be improved through a dilated convolution, so that the obtained multiple levels of features may contain wider range of information.

For example, the convolution structure of the last convolution sublayer of the multiple stages of convolution layer of the convolutional neural network may be a dilated convolution.

Figure 4:
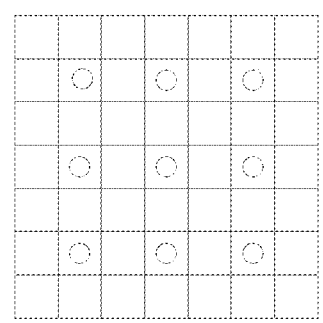
FIG. 4 is a schematic diagram of a dilated convolution according to an exemplary embodiment.

FIG. 4 is a schematic diagram of a dilated convolution according to an exemplary embodiment. In one possible implementation, as shown in FIG. 4, the dilated convolution is a dilated convolution with a hole size of 1, and the size of a convolution kernel is 3*3. In the feature extraction process of the convolution sub-layer, the dot of a circle in FIG. 4 may be subjected to a convolution operation with the 3*3 convolution kernel, and the remaining dots (holes) are not subjected to the convolution operation. Hence, the dilated convolution may improve the receptive field of convolution, so that after feature extraction processing is performed, the obtained multiple levels of features may contain wider range of information. The method for performing feature extraction processing on the to-be-predicted object to obtain multiple levels of features, and the size of holes of the dilated convolution are not limited in the present application.

In one possible implementation, aggregation processing is performed on the multiple levels of features to obtain feature information of the to-be-predicted object. For example, aggregation processing may be performed on each level of feature of the convolutional neural network, for example, aggregation processing (e.g., superposition and fusion) is performed on the first three higher levels of features to the feature of the last-stage convolution layer, and feature information of the to-be-predicted object is obtained after aggregation processing.

In one possible implementation, when aggregation processing is performed on the multiple levels of features, the higher levels of features may be downsampled through a convolution operation, and the feature with the same resolution as the feature of the last-stage convolution layer is obtained through bilinear interpolation processing.

For example, the resolution of each level of feature is different, for example, the resolution of the highest level of feature is the maximum, and the resolution of the lowest level (e.g., the feature of the last-stage convolution layer) is the minimum. When aggregation processing is performed on the multiple levels of features, the higher levels of features may be downsampled through a convolution operation, and the feature with the same resolution as the feature of the last-stage convolution layer is obtained through bilinear interpolation processing for aggregation processing (e.g., the multiple levels of processed features with the same resolution are subjected to superposition and fusion to obtain feature information of the to-be-predicted object). It should be understood that, by performing a convolution operation on the higher levels of features, the number of feature channels can be controlled, so that storage of the aggregation processing is more efficient.

In this way, feature information of the to-be-predicted object may be obtained, and the feature information may be used for better predicting the intermediate prediction results. The method for performing feature extraction processing on a to-be-predicted object to obtain feature information of the to-be-predicted object is not limited in the present application.

As shown in FIG. 1, at step S102, multiple intermediate prediction results for the to-be-predicted object are determined according to the feature information.

For example, multiple intermediate prediction results for the to-be-predicted object may be determined according to the feature information of the to-be-predicted object. For example, the feature information of the to-be-predicted object may be reconstructed into different intermediate prediction tasks, and multiple intermediate prediction results for the to-be-predicted object are determined. The intermediate prediction results may be used for assisting in determining target prediction results.

Figure 5:
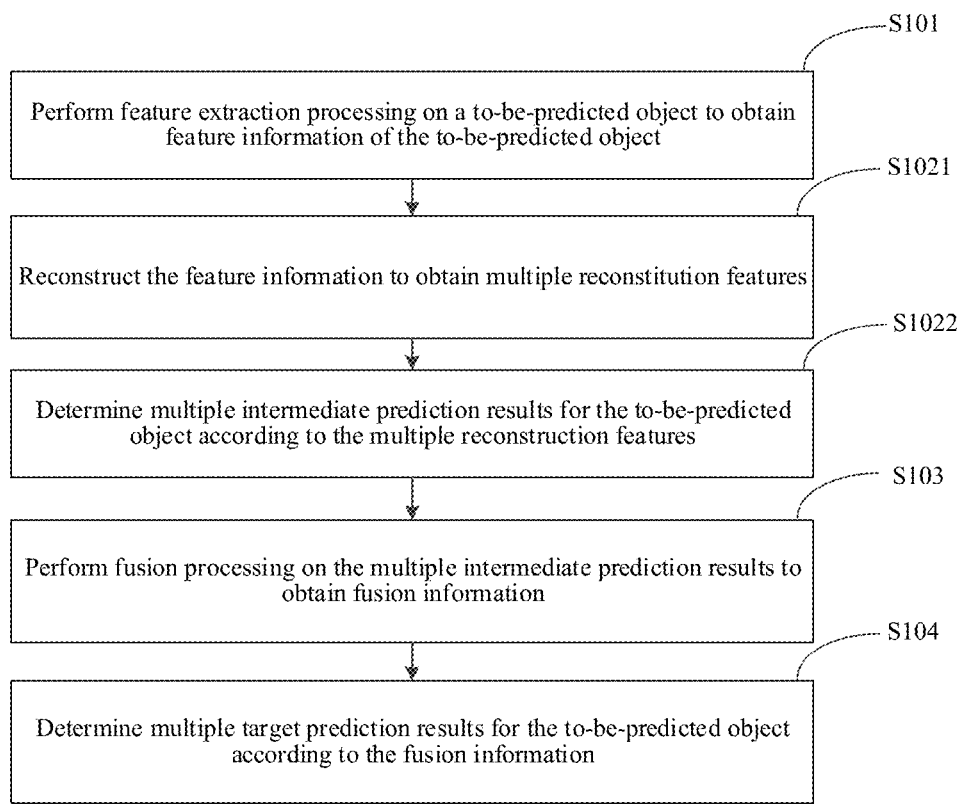
FIG. 5 is a flowchart of an object prediction method according to an exemplary embodiment.

FIG. 5 is a flowchart of an object prediction method according to an exemplary embodiment. In one possible implementation, as shown in FIG. 5, step S102 may include the following steps.

At step S1021, the feature information is reconstructed to obtain multiple reconstitution features.

For example, the feature information may be reconstructed, for example, a deconvolution operation may be performed on the feature information to obtain multiple reconstitution features. For example, as shown in FIG. 3, a deconvolution operation is performed on the feature information to obtain four reconstitution features respectively. When the deconvolution operation is performed on the feature information, four reconstitution features with the same resolution may be obtained, and the resolution of the reconstitution features is two times of the resolution of the feature information.

At step S1022, multiple intermediate prediction results for the to-be-predicted object are determined according to the multiple reconstruction features.

For example, a convolution operation may be performed on the multiple reconstitution features respectively to obtain intermediate prediction results of the multiple intermediate prediction tasks. The convolution operation is performed on the multiple reconstruction features respectively to obtain intermediate information of multiple corresponding intermediate prediction tasks, and bilinear interpolation processing is performed on the intermediate information of the multiple intermediate prediction tasks to obtain multiple intermediate prediction results with the resolution being one quarter of the original resolution of the to-be-predicted object. For example, as shown in FIG. 3, a depth estimation intermediate prediction result, a curved surface normal intermediate prediction result, a contour intermediate prediction result, and a semantic segmentation intermediate prediction result for the to-be-predicted object may be determined.

In this way, multiple intermediate prediction results for the to-be-predicted object are determined according to the feature information. The multiple intermediate prediction results may be used for assisting in determining multiple target prediction results. The method for determining multiple intermediate prediction results for the to-be-predicted object according to the feature information is not limited in the present application.

As shown in FIG. 1, at step S103, fusion processing is performed on the multiple intermediate prediction results to obtain fusion information.

For example, multiple intermediate prediction results (multi-modal data) for the to-be-predicted object are determined, and the multiple intermediate prediction results may be subjected to fusion processing in multiple manners to obtain fusion information. The fusion information may be used for determining multiple target prediction results for the to-be-predicted object. There can be one or more pieces of fusion information, and when there is one piece of fusion information, the fusion information may be used for determining multiple target prediction results for the to-be-predicted object, respectively. There can also be more pieces of fusion information, for example, fusion processing may be performed on the multiple intermediate prediction results to respectively obtain the more pieces of fusion information for determining the target prediction results. In this way, fusion processing is performed on the multiple intermediate prediction results to obtain fusion information, and the fusion information effectively combines more information from multiple related tasks (intermediate prediction results) to improve the accuracy of the multiple target prediction results. The method for obtaining the fusion information, and the number of the fusion information are not limited in the present application.

For example, fusion processing is performed on the depth estimation intermediate prediction result, the curved surface normal intermediate prediction result, the contour intermediate prediction result, and the semantic segmentation intermediate prediction result to obtain fusion information.

Figure 6:
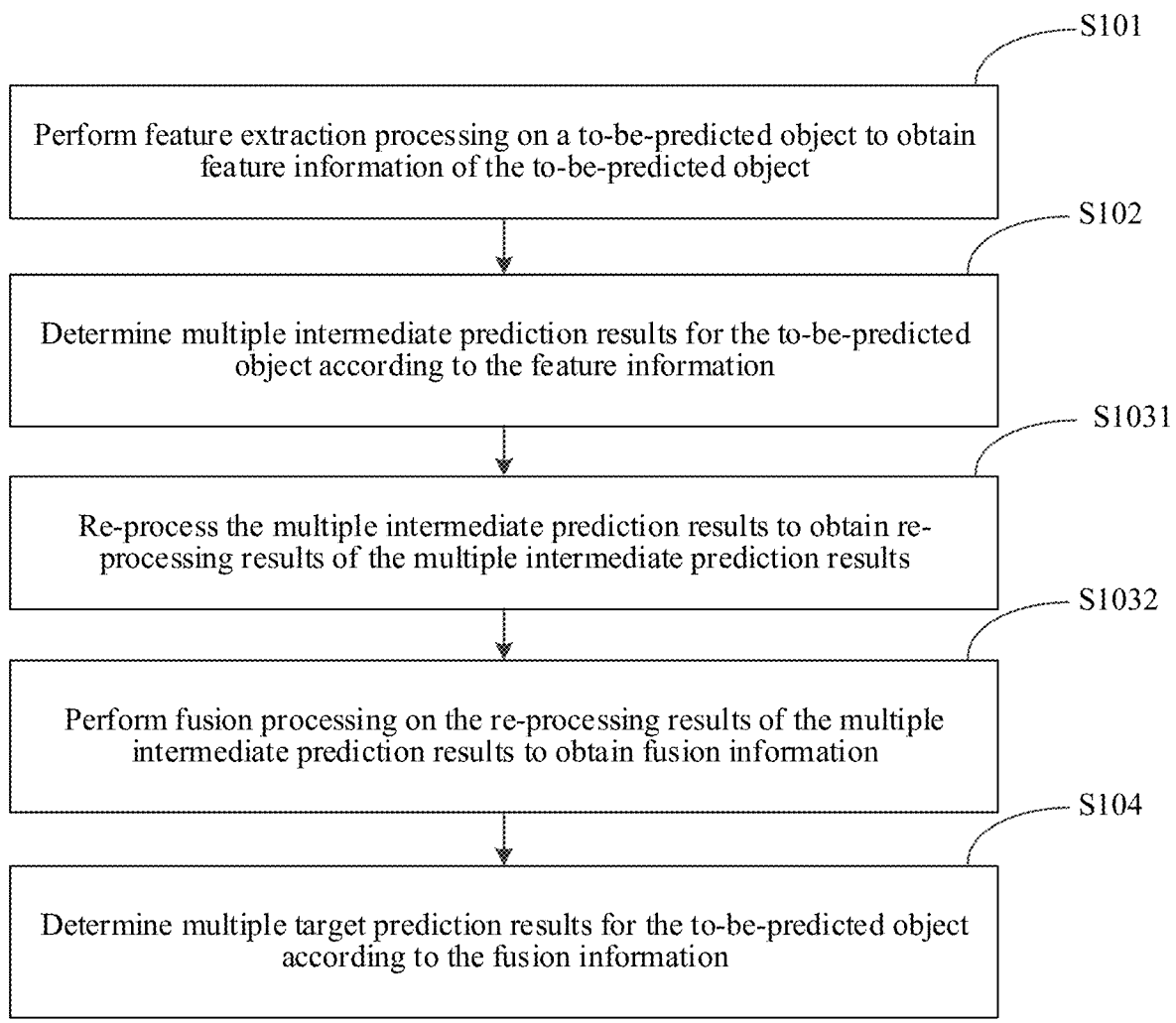
FIG. 6 is a flowchart of an object prediction method according to an exemplary embodiment.
Figure 7A:
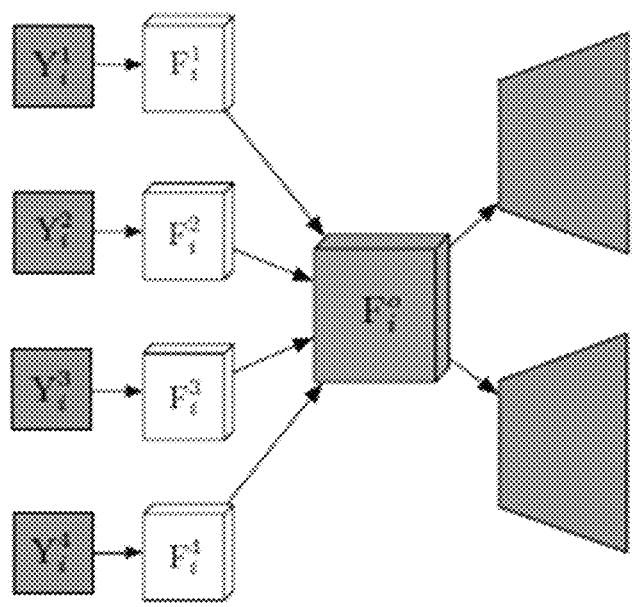
FIGS. 7a, 7b, and 7c are schematic diagrams of application scenes of an object prediction method according to exemplary embodiments, respectively.
Figure 7B:
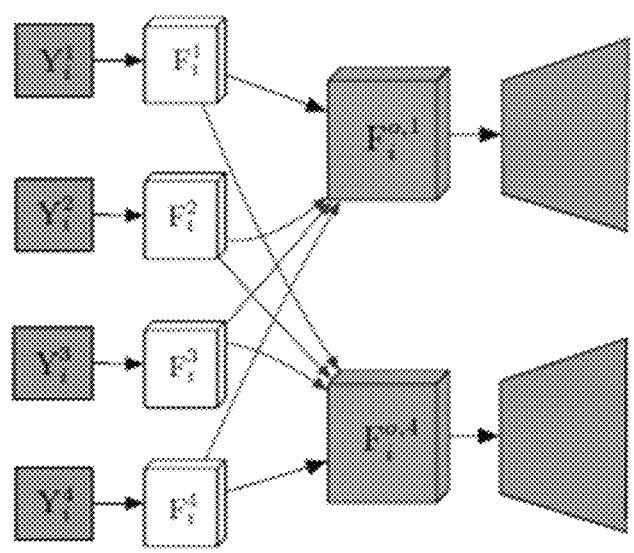
Figure 7C:
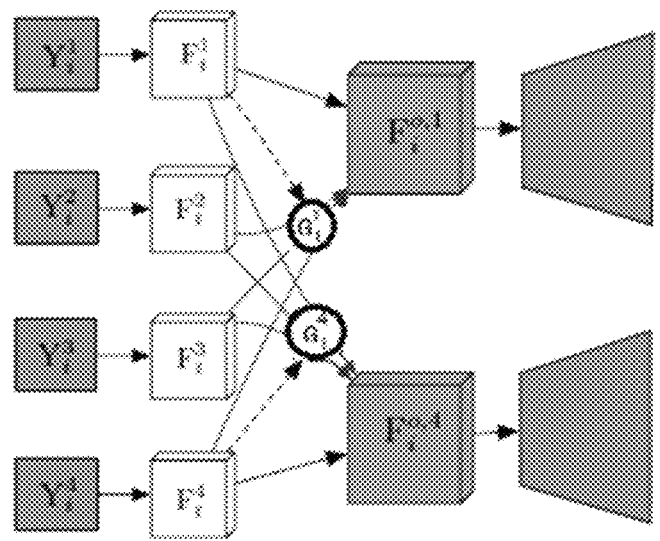

FIG. 6 is a flowchart of an object prediction method according to an exemplary embodiment. FIGS. 7a, 7b, and 7c are schematic diagrams of application scenes of an object prediction method according to exemplary embodiments, respectively. In one possible implementation, as shown in FIG. 6, step S103 may include the following steps.

At step S1031, the multiple intermediate prediction results are re-processed to obtain re-processing results of the multiple intermediate prediction results.

For example, the multiple intermediate prediction results may be re-processed, for example, the multiple intermediate prediction results may be subjected to a convolution operation to obtain re-processing results of the multiple intermediate prediction results, so as to obtain richer information, and reduce a difference between the multiple intermediate prediction results. The obtained re-processing results of the multiple intermediate prediction results have the same size as the intermediate prediction results.

For example, as shown in FIGS. 7a, 7b, and 7c, $Y_i^1$, $Y_i^2$, $Y_i^3$, and $Y_i^4$ represent four intermediate prediction results, respectively (for example, the depth estimation intermediate prediction result, the curved surface normal intermediate prediction result, the contour intermediate prediction result, and the semantic segmentation intermediate prediction result). The multiple intermediate prediction results are re-processed to obtain re-processing results of the multiple intermediate prediction results, such as, for example, the four corresponding re-processing results, i.e., $F_i^1$, $F_i^2$, $F_i^3$, and $F_i^4$, are obtained.

At step S1032, fusion processing is performed on the re-processing results of the multiple intermediate prediction results to obtain fusion information.

For example, fusing processing is performed on the re-processing results of the multiple intermediate prediction results to obtain fusion information.

In one possible implementation, step S1032 may include: performing superposition processing on the re-processing results of the multiple intermediate prediction results to obtain fusion information.

As shown in FIG. 7a, superposition processing (e.g., linear superposition) is performed on the four corresponding re-processing results, i.e., $F_i^1$, $F_i^2$, $F_i^3$, and $F_i^4$, to obtain fusion information $F_i^o$. The fusion information $F_i^o$ may be used for determining multiple target prediction results for the to-be-predicted object, for example, as shown in FIG. 7a, the fusion information $F_i^o$ is input into a depth estimation task branch and a scene segmentation task branch respectively, and a depth estimation result and a scene segmentation result for the to-be-predicted object are determined.

In this way, fusion information for determining multiple target prediction results is obtained. The method for performing superposition processing on the re-processing results of the intermediate prediction results is not limited in the present application.

In one possible implementation, the multiple intermediate prediction results include a first intermediate prediction result and second intermediate prediction results, where the first intermediate prediction result has the highest correlation degree with the target prediction result.

For example, as described above, the multiple intermediate prediction results are respectively a depth estimation intermediate prediction result, a curved surface normal intermediate prediction result, a contour intermediate prediction result, and a semantic segmentation intermediate prediction result. By taking the target prediction result as a depth estimation result as an example for description, the multiple intermediate prediction results may be divided into a first intermediate prediction result and second intermediate prediction results, where the first intermediate prediction result is a depth estimation intermediate prediction result having the highest correlation degree with the target prediction result (the depth estimation result). The remaining three intermediate prediction results are second intermediate prediction results.

In one possible implementation, step S1032 may further include:
processing the re-processing results of the second intermediate prediction results to obtain reference results; and
performing superposition processing on the re-processing result of the first intermediate prediction result and the reference results to obtain fusion information for the target prediction results.

An exemplary determination formula (1) of fusion information is given below:

$$F_i^{o,k} \leftarrow F_i^k + \sum_{t=1(\neq k)}^{T} (W_{t,k} \otimes F_i^t) \quad (1)$$

In formula (1), $F_i^{o,k}$ represents fusion information for the k-th target prediction result, $F_i^k$ represents a re-processing result of the k-th intermediate prediction result (the first intermediate prediction result) in the process of determining fusion information for the k-th target prediction result, $\otimes$ represents a convolution operation, $F_i^t$ represents the re-processing result of the t-th intermediate prediction result (a second intermediate prediction result), and $W_{t,k}$ represents parameters of a convolution kernel related to the t-th intermediate prediction result and the k-th intermediate prediction result, where k, t, and T are positive integers, t is a variable and ranges from 1 to T, and t≠k. ← represents that the fusion information of the left part may be obtained through superposition processing on the right part.

For example, as described above, two target prediction tasks are included, and two target prediction results for the to-be-predicted object are determined. Description is made by taking determining fusion information for the first target prediction result (a depth estimation result; k=1) as an example.

For example, it can be determined that, in $F_i^1$ (a depth estimation intermediate prediction result), $F_i^2$, $F_i^3$, and $F_i^4$, $F_i^1$ is a first intermediate prediction result having the highest correlation degree with the first target prediction result, and $F_1^2$, $F_i^3$, and $F_i^4$ are second intermediate prediction results respectively.

In one possible implementation, the re-processing results of the second intermediate prediction results are processed to obtain reference results.

For example, the re-processing results of the second intermediate prediction results are processed according to formula (1), for example, a convolution operation is performed on $F_i^2$, $F_i^3$, and $F_i^4$ respectively to obtain three reference results respectively.

In one possible implementation, superposition processing is performed on the re-processing result of the first intermediate prediction result and the reference results to obtain fusion information for the target prediction results.

For example, according to formula (1), superposition processing (for example, for each pixel, superposition processing is performed on the pixel information of the re-processing result of the first intermediate prediction result and the pixel information of the other three reference results) is performed on the re-processing result of the first intermediate prediction result and the reference results to obtain fusion information for the target prediction results. For example, as shown in FIG. 7b, fusion information $F_i^{o,\ 1}$ is obtained, and the fusion information $F_i^{o,\ 1}$ is fusion information for the first target prediction result and may be used for determining the first target prediction result. It should be understood that fusion information for the multiple target prediction results may be obtained respectively according to formula (1).

In this way, fusion information for the multiple target prediction results are determined. The fusion information may include more information in the re-processing result of the first intermediate prediction result having the highest correlation degree with the target prediction results, so that multi-modal data fusion may be performed smoothly. The specific method for performing superposition processing on the re-processing result of the first intermediate prediction result and the reference results to obtain fusion information for the target prediction results is not limited in the present application.

In one possible implementation, step S1032 may further include: determining an attention coefficient according to the re-processing result of the first intermediate prediction result, where the attention coefficient is a reference coefficient determined according to an attention mechanism;

processing the re-processing results of the second intermediate prediction results to obtain reference results;

performing dot product processing on the reference results and the attention coefficient to obtain attention content; and performing superposition processing on the re-processing result of the first intermediate prediction result and the attention content to obtain fusion information for the target prediction results.

An exemplary determination formula (2) of an attention coefficient is given below:

$$G_i^k \leftarrow \sigma(W_g^k \otimes F_i^k) \quad (2)$$

In formula (2), $G_i^k$ represents an attention coefficient determined according to the re-processing result of the first intermediate prediction result in the process of determining fusion information for the k-th target prediction result, $\otimes$ represents a convolution operation, $W_g^k$ represents a convolution parameter, $F_i^k$ represents a re-processing result of the k-th intermediate prediction result (a first intermediate prediction result) in the process of determining fusion information for the k-th target prediction result, and $\sigma$ represents a sigmoid function.

For example, an attention coefficient is determined according to the re-processing result of the first intermediate prediction result, where the attention coefficient is a reference coefficient determined according to an attention mechanism. Description is made by taking determining fusion information for the first target prediction result (a depth estimation result; k=1) as an example.

For example, as shown in FIG. 7c, an attention coefficient $G_i^1$ is determined according to the re-processing result $F_i^1$ of the first intermediate prediction result, and the attention coefficient is a reference coefficient determined according to an attention mechanism and may be used for filtering the multiple second intermediate prediction results and guiding transmission and fusion of information (for example, being used for paying more attention to or ignoring results from information of the second intermediate prediction results).

An exemplary determination formula (3) of fusion information is given below:

$$F_i^{o,k} \leftarrow F_i^k + \sum_{t=1(\neq k)}^{T} G_i^k \odot (W_t \otimes F_i^t) \quad (3)$$

In formula (3), $F_i^{o,k}$ represents fusion information for the k-th target prediction result, $F_i^k$ represents a re-processing result of the k-th intermediate prediction result (the first intermediate prediction result) in the process of determining fusion information for the k-th target prediction result, $\otimes$ represents a convolution operation, $F_i^t$ represents the re-processing result of the t-th intermediate prediction result (a second intermediate prediction result), $W_t$ represents parameters of a convolution kernel related to the t-th intermediate prediction result, $G_i^k$ represents an attention coefficient determined according to the re-processing result of the first intermediate prediction result in the process of determining fusion information for the k-th target prediction result, and $\odot$ represents dot product processing, where k, t, and T are positive integers, t is a variable and ranges from 1 to T, and t≠k. $G_i^k$ represents that the fusion information of the left part may be obtained through superposition processing on the right part.

In one possible implementation, the re-processing results of the second intermediate prediction results are processed to obtain reference results.

For example, the re-processing results of the second intermediate prediction results are processed according to formula (3), for example, a convolution operation is performed on $F_i^2$, $F_i^3$, and $F_i^4$ respectively to obtain three reference results respectively.

In one possible implementation, dot product processing is performed on the reference results and the attention coefficient to obtain attention content.

For example, the attention coefficient is determined according to formula (2). For example, the attention coefficient corresponding to each pixel is obtained. Dot product processing is performed on the reference results and the attention coefficient to obtain attention content. Dot product processing is performed on the reference results obtained according to $F_i^2$, $F_i^3$, and $F_i^4$, and the attention coefficient to obtain respective attention content.

In one possible implementation, superposition processing is performed on the re-processing result of the first intermediate prediction result and the attention content to obtain fusion information for the target prediction results.

For example, according to formula (3), superposition processing (for example, for each pixel, superposition processing is performed on the pixel information of the re-processing result of the first intermediate prediction result and the pixel information of the other three attention content) is performed on the re-processing result of the first intermediate prediction result and the multiple attention content to obtain fusion information for the target prediction results. For example, as shown in FIG. 7c, fusion information $F_i^{o,1}$ is obtained, and the fusion information $F_i^{o,1}$ is fusion information for the first target prediction result and may be used for determining the first target prediction result. It should be understood that fusion information for the multiple target prediction results may be obtained respectively according to formula (1).

In this way, fusion information for the multiple target prediction results is determined. The fusion information may include more information in the re-processing result of the first intermediate prediction result having the highest correlation degree with the target prediction results. The attention coefficient is determined through the re-processing result of the first intermediate prediction result, and may be used for filtering the multiple second intermediate prediction results and guiding transmission and fusion of information (for example, being used for paying more attention to or ignoring results from information of the second intermediate prediction results), so as to improve the pertinence of fusion information for the multiple target prediction results. The determination mode of the attention coefficient, the determination mode of the reference results, the determination mode of the attention content, and the determination mode of the fusion information are not limited in the present application.

As shown in FIG. 1, at step S104, multiple target prediction results for the to-be-predicted object are determined according to the fusion information.

For example, multiple target prediction results for the to-be-predicted object are determined according to the fusion information. For example, when there is one piece of the determined fusion information, the fusion information may be input into multiple branches used for target prediction tasks respectively, and multiple target prediction results are determined. When the determined fusion information is different fusion information for different target prediction tasks, the corresponding fusion information may be input into the corresponding target prediction task branches, and multiple target prediction results are determined. It should be understood that multiple target prediction tasks may be implemented by one sub-network (e.g., a second prediction network of a neural network). The sub-network may include different branches, and each branch may adopt various networks with different depths according to the task complexity and has different network parameters and different designs. The method for determining multiple target prediction results for the to-be-predicted object according to the fusion information, and the structures and designs of sub-networks of multiple target prediction tasks are not limited in the present application.

For example, a depth estimation result and a scene segmentation result for the to-be-predicted object are determined according to the fusion information.

Figure 8:
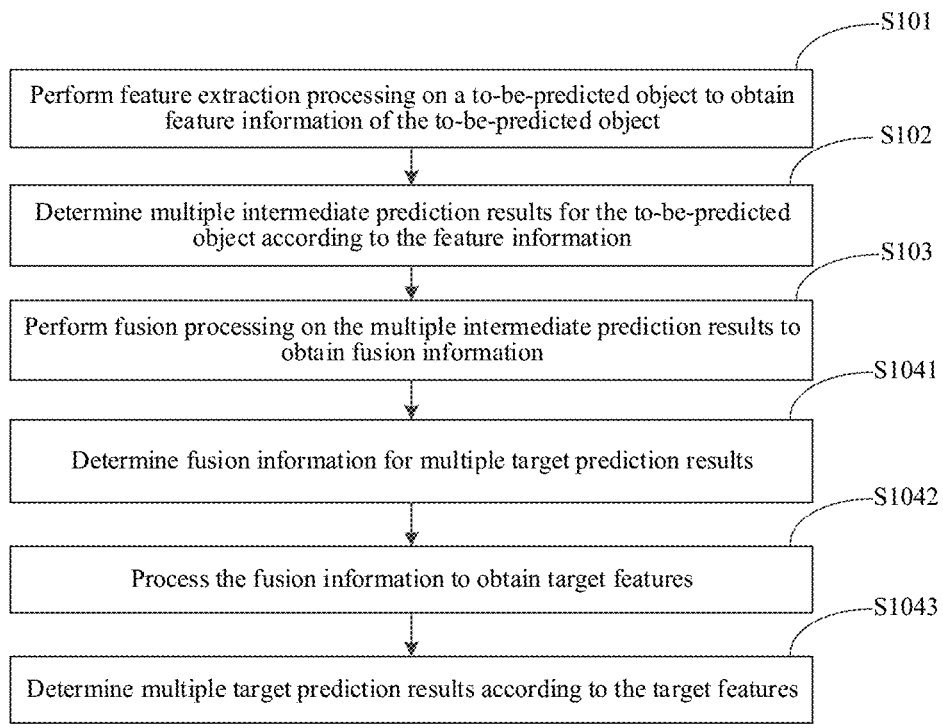
FIG. 8 is a flowchart of an object prediction method according to an exemplary embodiment.

FIG. 8 is a flowchart of an object prediction method according to an exemplary embodiment. In one possible implementation, as shown in FIG. 8, step S104 may include the following steps.

At step S1041, fusion information for multiple target prediction results is determined.

At step S1042, the fusion information is processed to obtain target features.

At step S1043, the multiple target prediction results are determined according to the target features.

For example, fusion information for multiple target prediction results is determined. For example, as shown FIG. 7b, fusion information for the depth estimation result is determined as $F_i^{o, 1}$, and fusion information for the scene segmentation result is determined as $F_i^{o, 2}$. The fusion information is processed to obtain target features, and multiple target prediction results are determined according to the target features.

The depth estimation result is determined as an example for description.

For example, fusion information for the depth estimation result, i.e., $F_i^{o, 1}$, is processed to obtain target features. For example, continuous two-time deconvolution operations are performed on the fusion information $F_i^{o, 1}$. As described above, the resolution of the multiple intermediate prediction results is one quarter of the original resolution of the to-be-predicted object, and target features having the same resolution as the original resolution of the to-be-predicted object are obtained through continuous two-time deconvolution operations (twice magnification of each time). Target prediction results are determined according to the target features. For example, a convolution operation is performed on the target features to determine target prediction results.

In this way, multiple target prediction results for the to-be-predicted object are determined according to the fusion information. The method for determining multiple target prediction results for the to-be-predicted object according to the fusion information is not limited in the present application.

It should be understood that the method may be applied to a scene of determining multiple target prediction results by using a trained neural network, and may also be applied to the process of training the neural network. No limitation is made thereto in embodiments of the present application. In one possible implementation, before determining multiple target prediction results by using a trained neural network, the steps of training the neural network with a to-be-predicted object may be included.

Figure 9:
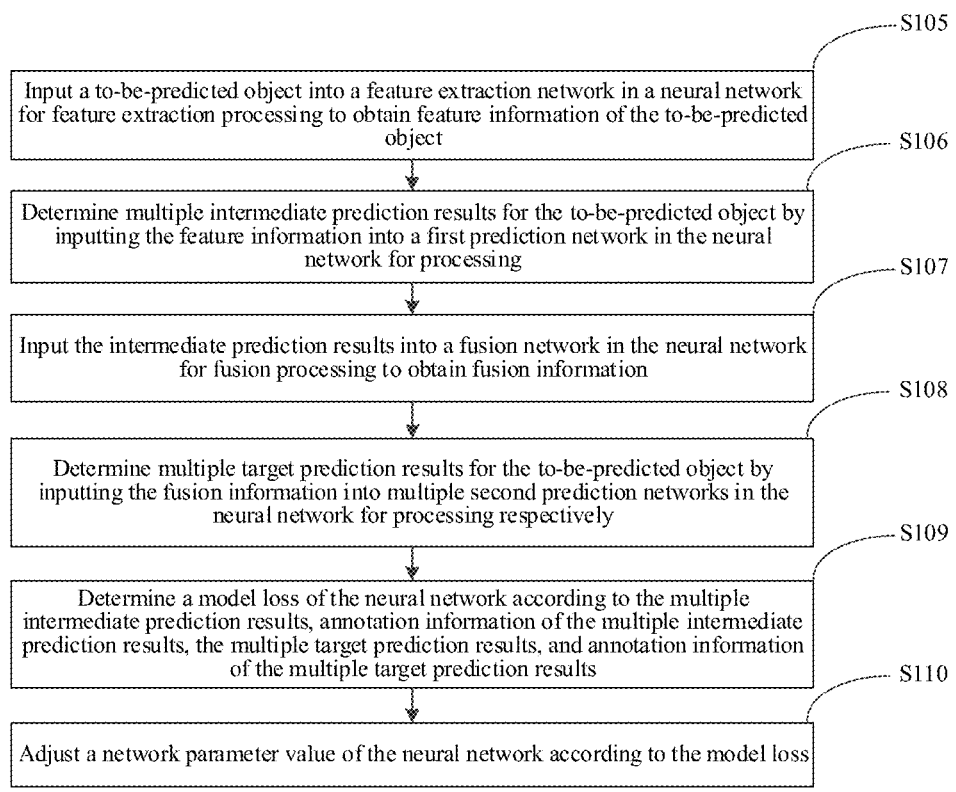
FIG. 9 is a flowchart for training a neural network in an object prediction method according to an exemplary embodiment.

FIG. 9 is a flowchart for training a neural network in an object prediction method according to an exemplary embodiment. In one possible implementation, as shown in FIG. 9, the steps of training the neural network with a to-be-predicted object are as follows.

At step S105, the to-be-predicted object is input into a feature extraction network in the neural network for feature extraction processing to obtain feature information of the to-be-predicted object.

At step S106, multiple intermediate prediction results for the to-be-predicted object are determined by inputting the feature information into a first prediction network in the neural network for processing.

At step S107, the intermediate prediction results are input into a fusion network in the neural network for fusion processing to obtain fusion information.

At step S108, multiple target prediction results for the to-be-predicted object are determined by inputting the fusion information into multiple second prediction networks in the neural network for processing respectively.

At step S109, a model loss of the neural network is determined according to the multiple intermediate prediction results, annotation information of the multiple intermediate prediction results, the multiple target prediction results, and annotation information of the multiple target prediction results.

At step S110, a network parameter value of the neural network is adjusted according to the model loss.

For example, the to-be-predicted object is input into a feature extraction network in the neural network for feature extraction processing to obtain feature information of the to-be-predicted object. Multiple intermediate prediction results for the to-be-predicted object are determined by inputting the feature information into a first prediction network in the neural network for processing. For example, four intermediate prediction results are determined.

The intermediate prediction results are input into a fusion network in the neural network for fusion processing to obtain fusion information, and multiple target prediction results for the to-be-predicted object are determined by inputting the fusion information into multiple second prediction networks in the neural network for processing respectively. A model loss of the neural network is determined according to the multiple intermediate prediction results, annotation information of the multiple intermediate prediction results, the multiple target prediction results, and annotation information of the multiple target prediction results.

For example, four intermediate prediction results for the to-be-predicted object are determined, and two target prediction results for the to-be-predicted object are finally determined. In the training process, the determined model loss of the neural network may be the sum of losses of six loss functions (comprising respective losses of four intermediate prediction results and respective losses of two target prediction results). The loss functions may include different types, for example, the loss function may be a cross entropy loss function in a contour intermediate prediction task, the loss function may be a Softmax loss function in a semantic segmentation intermediate prediction task (a scene segmentation prediction task), and the loss function may be an Euclidean distance loss function in a depth estimation intermediate prediction task (a depth estimation prediction task) and a curved surface normal intermediate prediction task. When the model loss of the neural network is determined, the loss weights of the loss functions cannot be completely the same. For example, the loss weights of the loss functions of the depth estimation intermediate prediction task, the depth estimation prediction task, the scene segmentation prediction task, and the semantic segmentation intermediate prediction task may be set as 1, and the loss weights of the loss functions of the curved surface normal intermediate prediction task and the contour intermediate prediction task may be set as 0.8. The types of the loss functions and the weights losses of the loss functions are not limited in the present application.

In one possible implementation, a network parameter value of the neural network is adjusted according to the model loss. For example, the network parameter value is adjusted by using a reverse gradient algorithm and the like. It should be understood that the network parameter value of the neural network may be adjusted in an appropriate manner, which is not limited in the present application.

After multiple times of adjustment, if a preset training condition is met, for example, the adjusting frequency reaches a preset training frequency threshold or the model loss is less than or equal to a preset loss threshold, the current neural network may be determined as a final neural network, so that the training process of the neural network is completed. It should be understood that persons skilled in the art could set training conditions and loss thresholds according to actual conditions, which is not limited in the present application.

In this way, the neural network capable of accurately obtaining multiple target prediction results may be obtained through training. In the training process, feature information is obtained by inputting the to-be-predicted object (e.g., an RGB image), and multiple intermediate prediction results are obtained according to the feature information. The multiple intermediate prediction results can serve as supervision information for learning deeper-level features, and also provide richer multi-modal data to improve final target prediction tasks, assist in determining final multiple target prediction results, and improve generalization ability and prediction performance of the multiple target prediction tasks, so as to improve the accuracy of the multiple target prediction results.

In addition, according to the embodiments of the present application, in the process of inputting the to-be-predicted object for training of the neural network, instead of directly using different loss functions, and directly training the multiple target prediction results simultaneously, the multiple intermediate prediction results are determined, and the multiple intermediate prediction results are used for assisting in determining the multiple target prediction results, so that the training complexity of neural network is reduced, and good training efficiency and effects are ensured.

Figure 10:
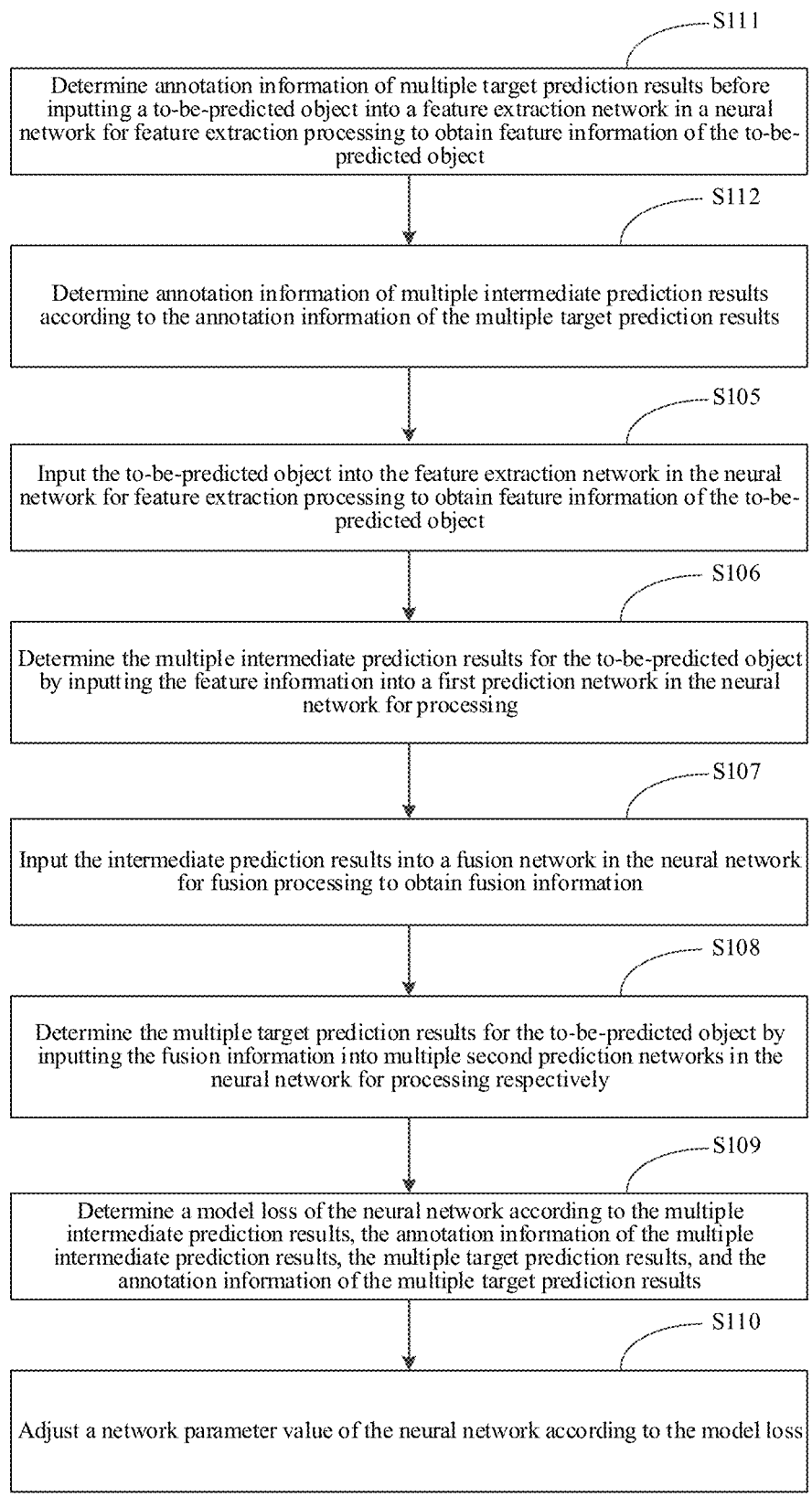
FIG. 10 is a flowchart for training a neural network in an object prediction method according to an exemplary embodiment.

FIG. 10 is a flowchart for training a neural network in an object prediction method according to an exemplary embodiment. In one possible implementation, as shown in FIG. 10, the steps of training the neural network with a to-be-predicted object are as follows.

At step S111, the annotation information of the multiple target prediction results is determined before the to-be-predicted object is input into the feature extraction network in the neural network for feature extraction processing to obtain the feature information of the to-be-predicted object.

At step S112, the annotation information of the multiple intermediate prediction results is determined according to the annotation information of the multiple target prediction results.

For example, as described above, the target prediction results include a depth estimation result and a scene segmentation result. In the process of training the neural network, annotation information of the two target prediction results is determined, for example, being determined by means of manual tagging. Annotation information of the multiple intermediate prediction results may be determined according to the annotation information of the depth estimation result and the scene segmentation result. For example, the intermediate prediction results include a depth estimation intermediate prediction result, a curved surface normal intermediate prediction result, a contour intermediate prediction result, and a semantic segmentation intermediate prediction result. The annotation information of the depth estimation result and the scene segmentation result are respectively determined as annotation information of the depth estimation intermediate prediction result and the semantic segmentation intermediate prediction result. The annotation information of the contour intermediate prediction result may be obtained by calculating the annotation information of the scene segmentation result, and the annotation information of the curved surface normal intermediate prediction result may be obtained by calculating the annotation information of the depth estimation result.

In this way, in the neural network training process, annotation information of the multiple intermediate prediction results is determined according to the annotation information of the multiple target prediction results, so that more annotation information is used as supervision information for training the neural network, excessive annotation tasks do not need to be completed, and the neural network training efficiency is improved. The method for determining annotation information of the multiple intermediate prediction results according to the annotation information of the multiple target prediction results is not limited in the present application.

Figure 11:
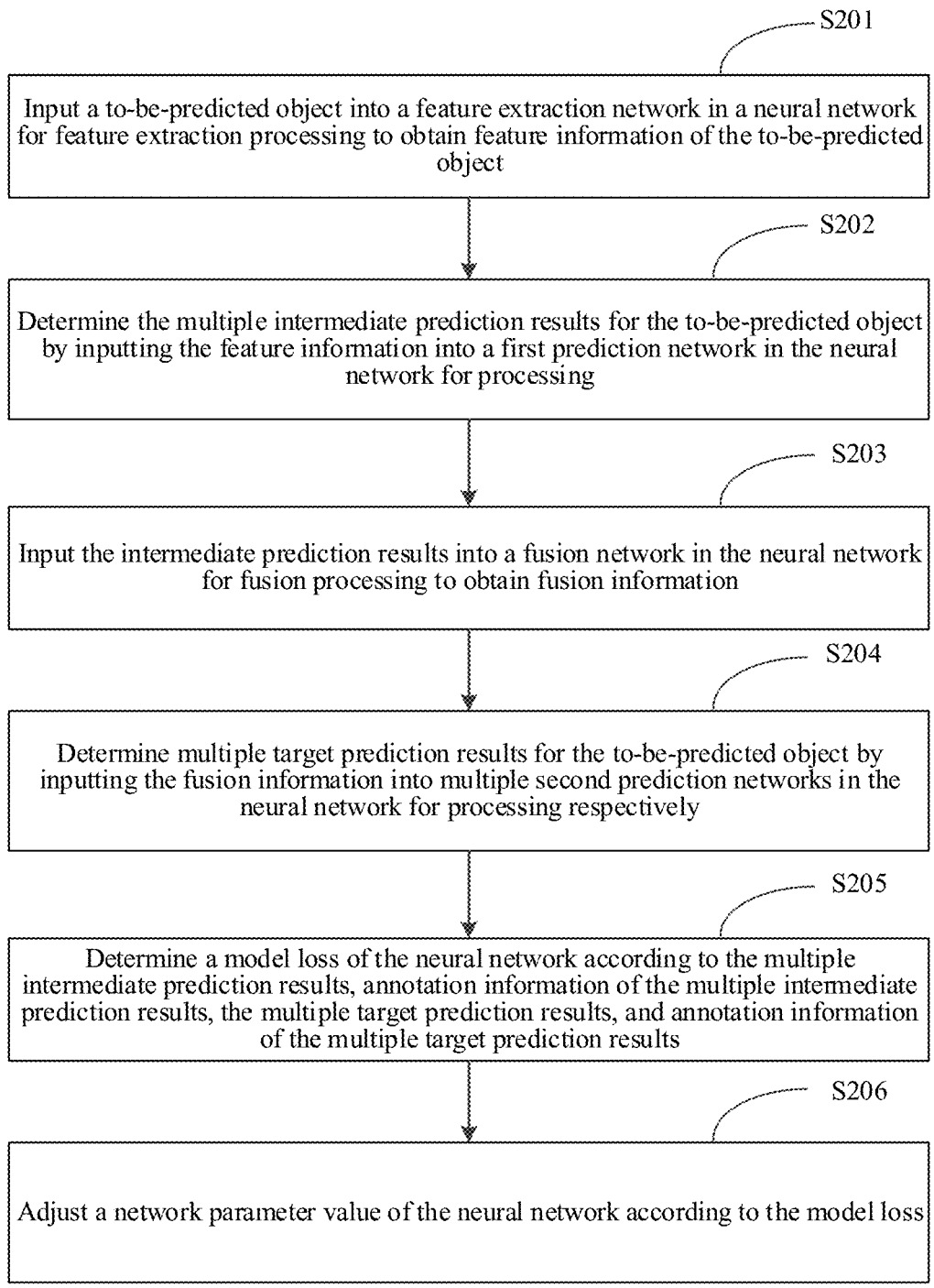
FIG. 11 is a flowchart of an object prediction method according to an exemplary embodiment.

FIG. 11 is a flowchart of an object prediction method according to an exemplary embodiment. The method may be applied to an electronic device. The electronic device may be provided as a terminal, a server, or other forms of devices. As shown in FIG. 11, the object prediction method according to the embodiments of the present application includes the following steps.

At step S201, a to-be-predicted object is input into a feature extraction network in the neural network for feature extraction processing to obtain feature information of the to-be-predicted object.

At step S202, multiple intermediate prediction results for the to-be-predicted object are determined by inputting the feature information into a first prediction network in the neural network for processing.

At step S203, the intermediate prediction results are input into a fusion network in the neural network for fusion processing to obtain fusion information.

At step S204, multiple target prediction results for the to-be-predicted object are determined by inputting the fusion information into multiple second prediction networks in the neural network for processing respectively.

At step S205, a model loss of the neural network is determined according to the multiple intermediate prediction results, annotation information of the multiple intermediate prediction results, the multiple target prediction results, and annotation information of the multiple target prediction results.

At step S206, a network parameter value of the neural network is adjusted according to the model loss.

According to the embodiments of the present application, the neural network may be obtained through training according the to-be-predicted object, and the neural network may be used for determining multiple target prediction results for the to-be-predicted object.

For example, the neural network may be obtained through training as described above, and details are not described herein again.

Figure 12:
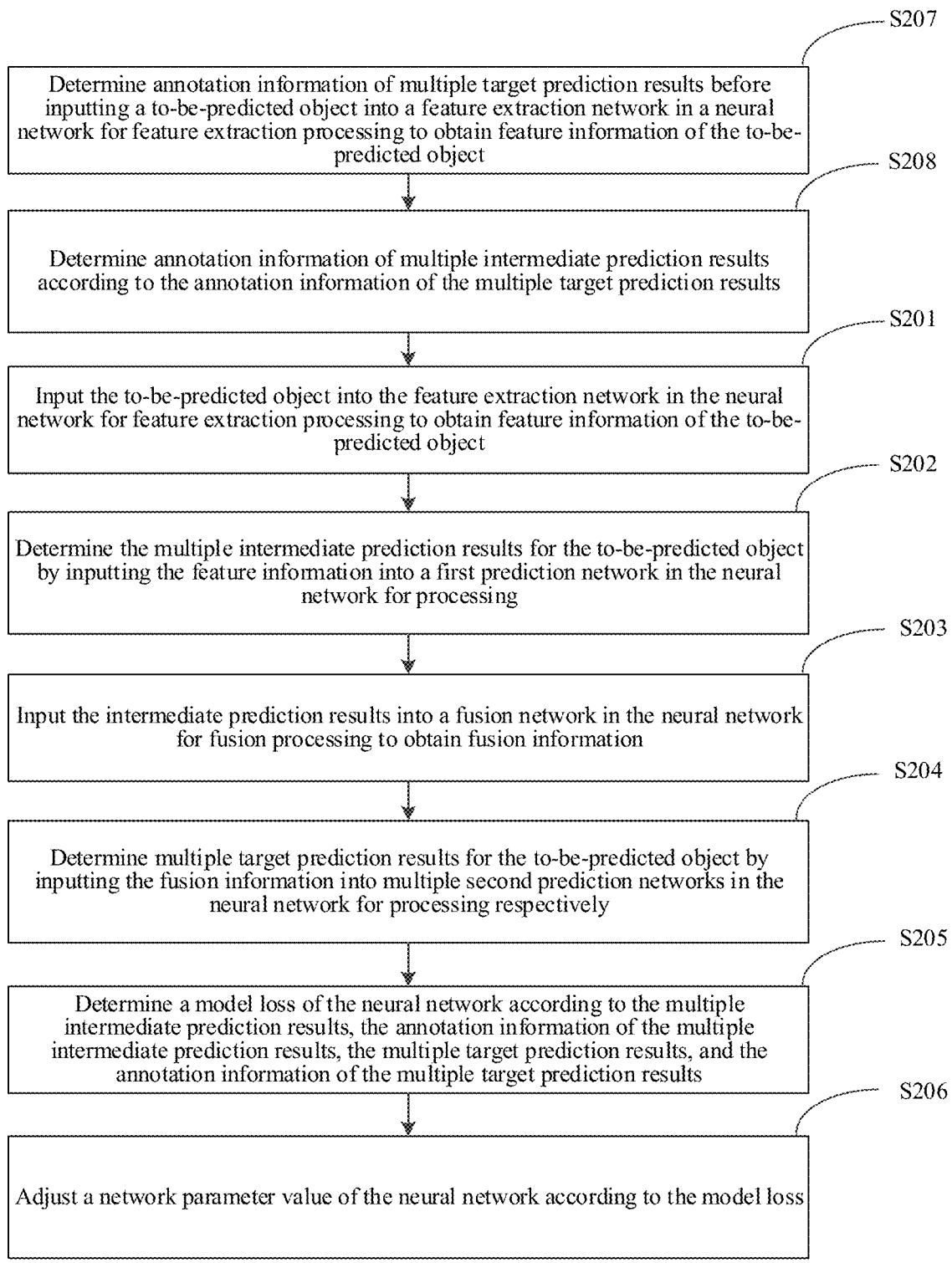
FIG. 12 is a flowchart of an object prediction method according to an exemplary embodiment.

FIG. 12 is a flowchart of an object prediction method according to an exemplary embodiment. In one possible implementation, as shown in FIG. 12, the method further includes the following steps.

At step S207, the annotation information of the multiple target prediction results is determined before the to-be-predicted object is input into the feature extraction network in the neural network for feature extraction processing to obtain the feature information of the to-be-predicted object.

At step S208, the annotation information of the multiple intermediate prediction results is determined according to the annotation information of the multiple target prediction results.

For example, as described above, details are not described herein again.

The exemplary embodiments of the present application are described above. It should be understood that the description of the exemplary embodiments does not constitute a limitation of the present application, and various technical features in the exemplary embodiments may be arbitrarily combined, modified and changed according to actual needs and logic to form different technical solutions, which are part of the embodiments of the present application.

Figure 13:
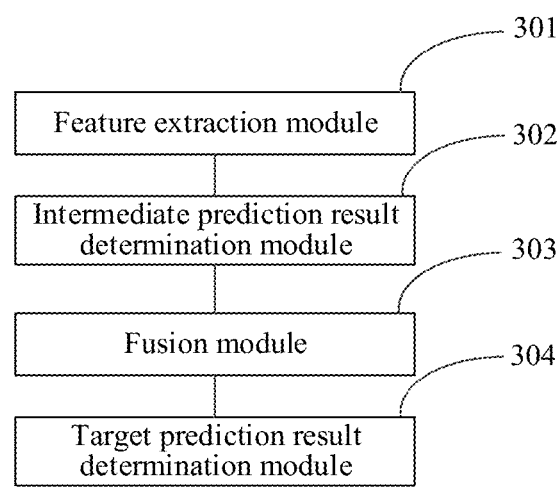
FIG. 13 is a block diagram of an object prediction apparatus according to an exemplary embodiment.

FIG. 13 is a block diagram of an object prediction apparatus according to an exemplary embodiment. As shown in FIG. 13, the image processing apparatus includes:

a feature extraction module 301, configured to perform feature extraction processing on a to-be-predicted object to obtain feature information of the to-be-predicted object;

an intermediate prediction result determination module 302, configured to determine multiple intermediate prediction results for the to-be-predicted object according to the feature information;

a fusion module 303, configured to perform fusion processing on the multiple intermediate prediction results to obtain fusion information; and a target prediction result determination module 304, configured to determine multiple target prediction results for the to-be-predicted object according to the fusion information.

Figure 14:
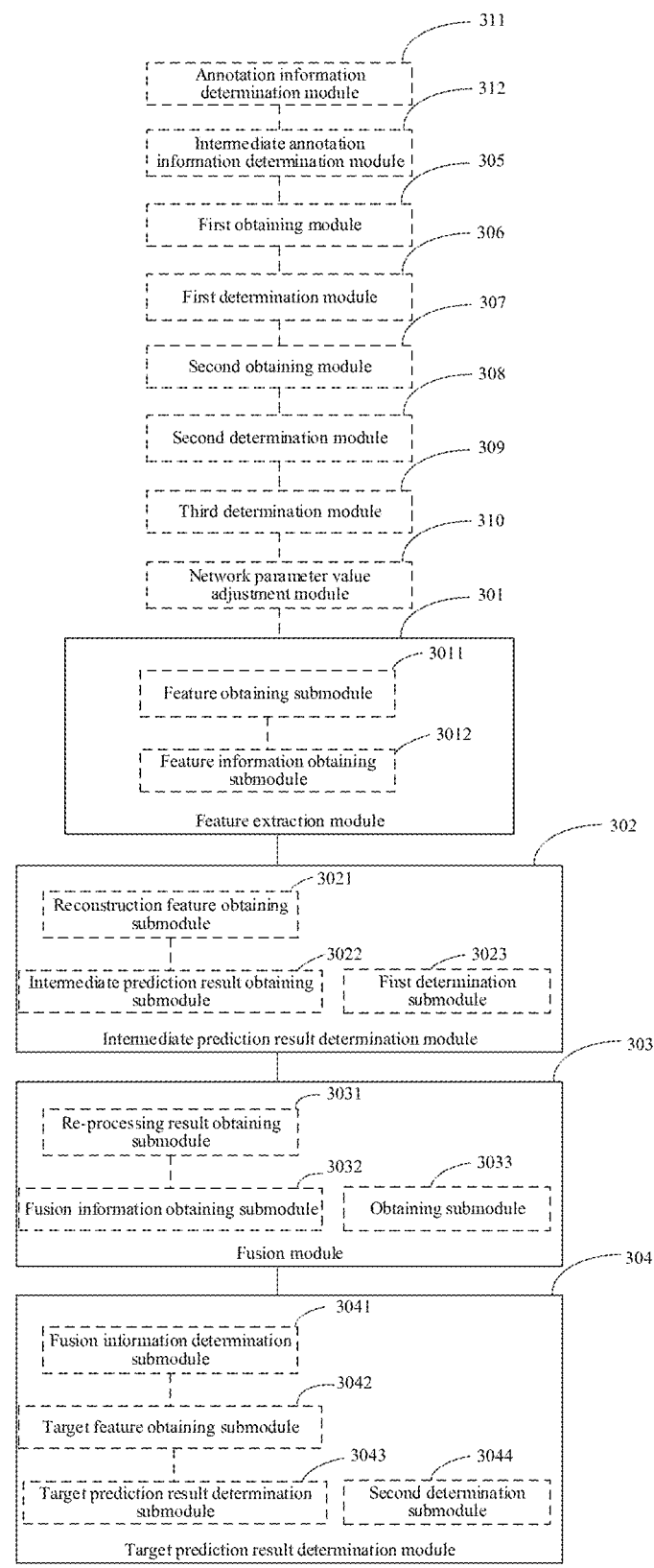
FIG. 14 is a block diagram of an object prediction apparatus according to an exemplary embodiment.

FIG. 14 is a block diagram of an object prediction apparatus according to an exemplary embodiment. As shown in FIG. 14, in one possible implementation, the feature extraction module 301 includes:

a feature obtaining submodule 3011, configured to perform feature extraction processing on a to-be-predicted object to obtain multiple levels of features; and a feature information obtaining submodule 3012, configured to perform aggregation processing on the multiple levels of features to obtain feature information of the to-be-predicted object.

As shown in FIG. 14, in one possible implementation, the intermediate prediction result determination module 302 includes:

a reconstruction feature obtaining submodule 3021, configured to reconstruct the feature information to obtain multiple reconstitution features; and an intermediate prediction result obtaining submodule 3022, configured to determine multiple intermediate prediction results for the to-be-predicted object according to the multiple reconstitution features.

As shown in FIG. 14, in one possible implementation, the fusion module 303 includes:

a re-processing result obtaining submodule 3031, configured to re-process the multiple intermediate prediction results to obtain re-processing results of the multiple intermediate prediction results; and a fusion information obtaining submodule 3032, configured to perform fusion processing on the re-processing results of the multiple intermediate prediction results to obtain fusion information.

In one possible implementation, the fusion information obtaining submodule 3032 is configured to:

perform superposition processing on the re-processing results of the multiple intermediate prediction results to obtain fusion information.

In one possible implementation, the multiple intermediate prediction results include a first intermediate prediction result and second intermediate prediction results, where the first intermediate prediction result has the highest correlation degree with the target prediction result.

The fusion information obtaining submodule 3032 is configured to:

process the re-processing results of the second intermediate prediction results to obtain reference results; and perform superposition processing on the re-processing result of the first intermediate prediction result and the reference results to obtain fusion information for the target prediction results.

In one possible implementation, the multiple intermediate prediction results include a first intermediate prediction result and second intermediate prediction results, where the first intermediate prediction result has the highest correlation degree with the target prediction result.

The fusion information obtaining submodule 3032 is configured to:

determine an attention coefficient according to the re-processing result of the first intermediate prediction result, where the attention coefficient is a reference coefficient determined according to an attention mechanism;

process the re-processing results of the second intermediate prediction results to obtain reference results;

perform dot product processing on the reference results and the attention coefficient to obtain attention content; and perform superposition processing on the re-processing result of the first intermediate prediction result and the attention content to obtain fusion information for the target prediction results.

As shown in FIG. 14, in one possible implementation, the target prediction result determination module 304 includes:

a fusion information determination submodule 3041, configured to determine fusion information for multiple target prediction results;

a target feature obtaining submodule 3042, configured to process the fusion information to obtain target features; and a target prediction result determination submodule 3043, configured to determine the multiple target prediction results according to the target features.

In one possible implementation, the neural network is trained with a to-be-predicted object.

As shown in FIG. 14, in one possible implementation, the apparatus further includes:

a first obtaining module 305, configured to input the to-be-predicted object into a feature extraction network in the neural network for feature extraction processing to obtain feature information of the to-be-predicted object;

a first determination module 306, configured to determine multiple intermediate prediction results for the to-be-predicted object by inputting the feature information into a first prediction network in the neural network for processing;

a second obtaining module 307, configured to input the intermediate prediction results into a fusion network in the neural network for fusion processing to obtain the fusion information;

a second determination module 308, configured to determine multiple target prediction results for the to-be-predicted object by inputting the fusion information into multiple second prediction networks in the neural network for processing respectively;

a third determination module 309, configured to determine a model loss of the neural network according to the multiple intermediate prediction results, annotation information of the multiple intermediate prediction results, the multiple target prediction results, and annotation information of the multiple target prediction results; and a network parameter value adjustment module 310, configured to adjust a network parameter value of the neural network according to the model loss.

As shown in FIG. 14, in one possible implementation, the apparatus further includes:

an annotation information determination module 311, configured to determine the annotation information of the multiple target prediction results before inputting the to-be-predicted object into the feature extraction network in the neural network for feature extraction processing to obtain the feature information of the to-be-predicted object; and an intermediate annotation information determination module 312, configured to determine the annotation information of the multiple intermediate prediction results according to the annotation information of the multiple target prediction results.

As shown in FIG. 14, in one possible implementation, the intermediate prediction result determination module 302 includes:

a first determination submodule 3023, configured to determine a depth estimation intermediate prediction result, a curved surface normal intermediate prediction result, a contour intermediate prediction result, and a semantic segmentation intermediate prediction result for the to-be-predicted object according to the feature information.

The fusion module 303 includes:

an obtaining submodule 3033, configured to perform fusion processing on the depth estimation intermediate prediction result, the curved surface normal intermediate prediction result, the contour intermediate prediction result, and the semantic segmentation intermediate prediction result to obtain fusion information.

The target prediction result determination module 304 includes:

a second determination submodule 3044, configured to determine a depth estimation result and a scene segmentation result for the to-be-predicted object according to the fusion information.

Figure 15:
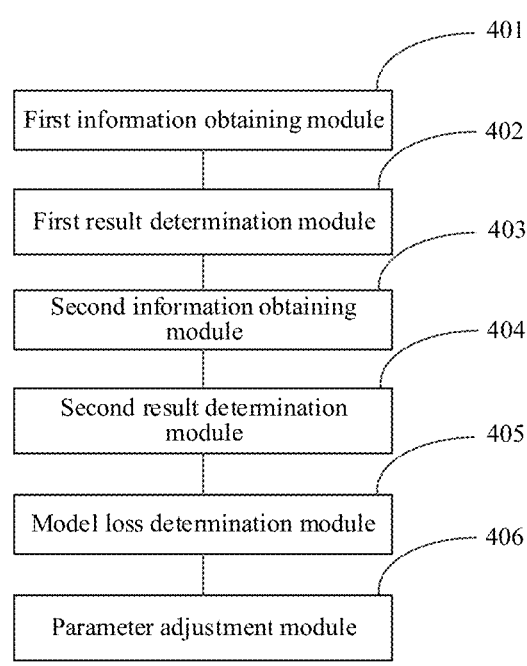
FIG. 15 is a block diagram of an object prediction apparatus according to an exemplary embodiment.

FIG. 15 is a block diagram of an object prediction apparatus according to an exemplary embodiment. As shown in FIG. 15, the object prediction apparatus includes:

a first information obtaining module 401, configured to input a to-be-predicted object into a feature extraction network in the neural network for feature extraction processing to obtain feature information of the to-be-predicted object;

a first result determination module 402, configured to determine multiple intermediate prediction results for the to-be-predicted object by inputting the feature information into a first prediction network in the neural network for processing;

a second information obtaining module 403, configured to input the intermediate prediction results into a fusion network in the neural network for fusion processing to obtain fusion information;

a second result determination module 404, configured to determine multiple target prediction results for the to-be-predicted object by inputting the fusion information into multiple second prediction networks in the neural network for processing respectively;

a model loss determination module 405, configured to determine a model loss of the neural network according to the multiple intermediate prediction results, annotation information of the multiple intermediate prediction results, the multiple target prediction results, and annotation information of the multiple target prediction results; and a parameter adjustment module 406, configured to adjust a network parameter value of the neural network according to the model loss.

Figure 16:
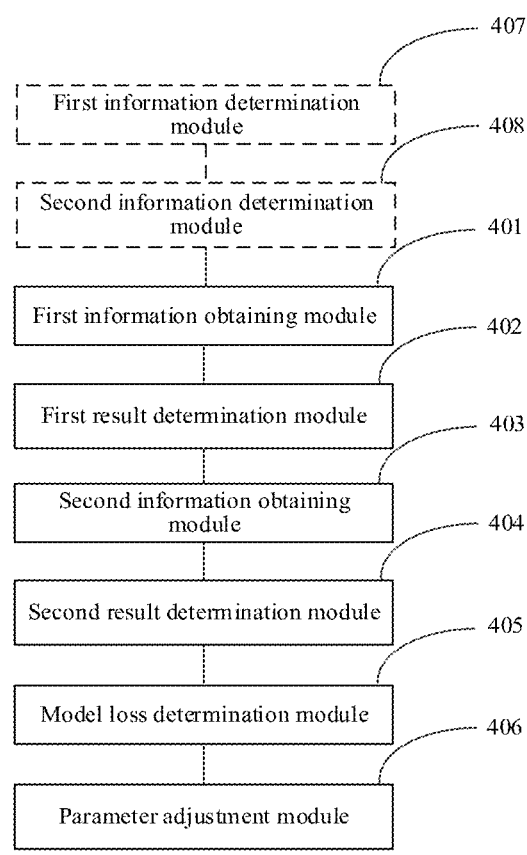
FIG. 16 is a block diagram of an object prediction apparatus according to an exemplary embodiment.

FIG. 16 is a block diagram of an object prediction apparatus according to an exemplary embodiment. As shown in FIG. 16, in one possible implementation, the apparatus further includes:

a first information determination module 407, configured to determine the annotation information of the multiple target prediction results before inputting the to-be-predicted object into the feature extraction network in the neural network for feature extraction processing to obtain the feature information of the to-be-predicted object; and a second information determination module 408, configured to determine the annotation information of the multiple intermediate prediction results according to the annotation information of the multiple target prediction results.

Figure 17:
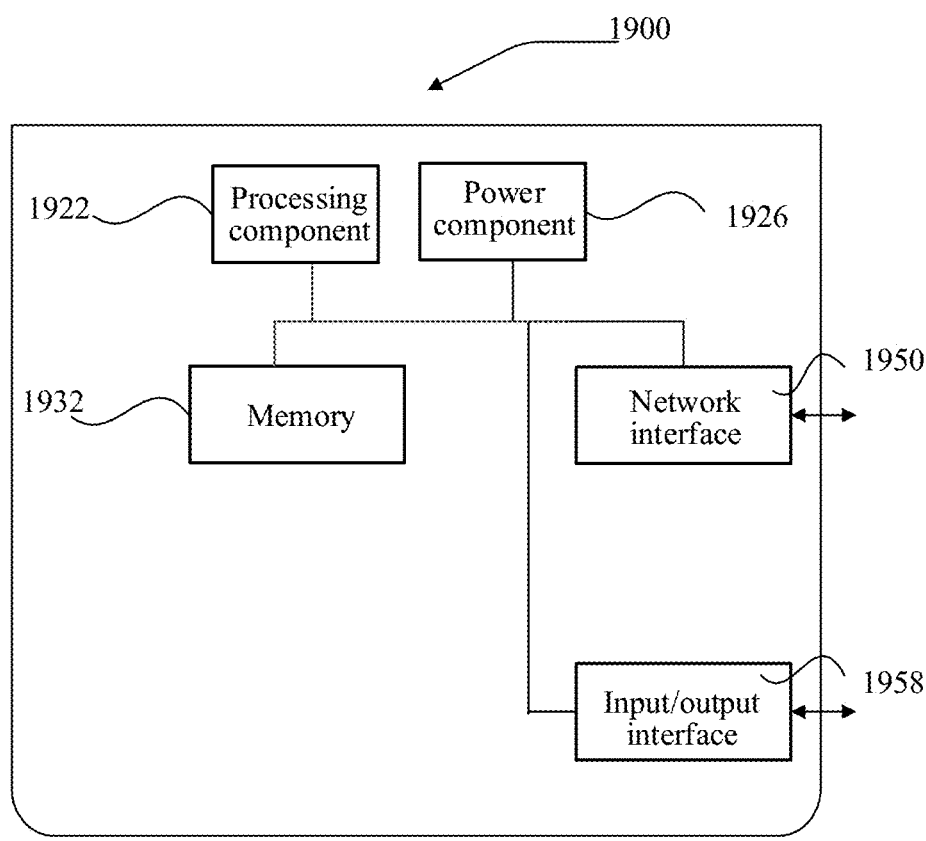
FIG. 17 is a block diagram of an electronic device according to an exemplary embodiment.

FIG. 17 is a block diagram of an electronic device according to an exemplary embodiment. For example, the electronic device may be provided as a terminal, a server, or other forms of devices. Referring to FIG. 17, the device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above method.

The device 1900 may further include a power supply component 1926 configured to execute power management of the device 1900, a wired or wireless network interface 1950 configured to connect the device 1900 to the network, and an input/output (I/O) interface 1958. The device 1900 may be operated based on an operating system stored in the memory 1932, such as Windows Server™, Mac OS X™, Unix™, Linux™, FreeBSD™ or the like.

In an exemplary embodiment, a computer-readable storage medium is further provided, for example, a memory 1932 including computer program instructions, which can be executed by the processing component 1922 of the device 1900 to implement the method above.

In an exemplary embodiment, further provided is a computer program, including a computer readable code, where when the computer readable code runs in an electronic device, a processor in the electronic device executes instructions for implementing the above method.

The present application may be a system, a method, and/or a computer program product. The computer program product may include a computer-readable storage medium having computer-readable program instructions thereon for causing a processor to implement the aspects of the present application.

The computer readable storage medium may be a tangible device that can maintain and store instructions used by an instruction execution device. The computer readable storage medium may be, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer readable program instruction described here is downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer readable program instruction from the network, and forwards the computer readable program instruction, so that the computer readable program instruction is stored in a computer readable storage medium in each computing/processing device.

Computer program instructions for carrying out operations of the present application may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The program readable program instructions can be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any type of network, including a Local Area Network (LAN) or a Wide Area Network (WAN), or may be connected to an external computer (for example, connected via the Internet with the aid of an Internet service provider). In some embodiments, electronic circuitry including, for example, programmable logic circuitry, Field-Programmable Gate Arrays (FGPAs), or Programmable Logic Arrays (PLAs) may execute the computer-readable program instructions by utilizing state information of the computer-readable program instructions to personalize the electronic circuitry, in order to implement the aspects of the present application.

The aspects of the present application are described herein with reference to flowcharts and/or block diagrams of methods, apparatuses (systems), and computer program products according to the embodiments of the present application. It should be understood that each block in the flowcharts and/or block diagrams and a combination of the blocks in the flowcharts and/or block diagrams can be implemented with the computer readable program instructions.

These computer readable program instructions may be provided for a general-purpose computer, a dedicated computer, or a processor of another programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer readable program instructions may also be stored in a computer readable storage medium, and these instructions instruct a computer, a programmable data processing apparatus, and/or other devices to work in a specific manner. Therefore, the computer readable storage medium having the instructions stored thereon includes a manufacture, and the manufacture includes instructions for implementing specified functions/actions in one or more blocks in the flowcharts and/or block diagrams.

The computer readable program instructions may also be loaded onto a computer, other programmable data processing apparatuses, or other devices, so that a series of operations and steps are executed on the computer, the other programmable apparatuses, or the other devices, thereby generating computer-implemented processes. Therefore, the instructions executed on the computer, the other programmable apparatuses, or the other devices implement the specified functions/actions in the one or more blocks in the flowcharts and/or block diagrams.

The flowcharts and block diagrams in the accompanying drawings illustrate the architecture, functionality and operations of possible implementations of systems, methods, and computer program products according to multiple embodiments of the present application. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The descriptions of the embodiments of the present application have been presented for purposes of illustration, but are not intended to be exhaustive or limited to the embodiments disclosed. Many modifications and variations will be apparent to persons of ordinary skill in the art without departing from the scope and spirit of the described embodiments.

The terminology used herein was chosen to best explain the principles of the embodiments, the practical application or technical improvement over technologies found in the marketplace, or to enable other persons of ordinary skill in the art to understand the embodiments disclosed herein.

What is claimed is:

1. An object prediction method, applied to a neural network and comprising:
    performing feature extraction processing on a to-be-predicted object to obtain feature information of the to-be-predicted object;
    determining multiple intermediate prediction results for the to-be-predicted object according to the feature information;
    performing fusion processing on the multiple intermediate prediction results to obtain fusion information; and
    determining multiple target prediction results for the to-be-predicted object according to the fusion information.

2. The method according to claim 1, wherein performing feature extraction processing on the to-be-predicted object to obtain feature information of the to-be-predicted object comprises:
    performing feature extraction processing on a to-be-predicted object to obtain multiple levels of features; and
    performing aggregation processing on the multiple levels of features to obtain feature information of the to-be-predicted object.

3. The method according to claim 1, wherein determining multiple intermediate prediction results for the to-be-predicted object according to the feature information comprises:
    reconstructing the feature information to obtain multiple reconstitution features; and
    determining multiple intermediate prediction results for the to-be-predicted object according to the multiple reconstruction features.

4. The method according to claim 1, wherein performing fusion processing on the multiple intermediate prediction results to obtain fusion information comprises:
    re-processing the multiple intermediate prediction results to obtain re-processing results of the multiple intermediate prediction results; and
    performing fusion processing on the re-processing results of the multiple intermediate prediction results to obtain fusion information.

5. The method according to claim 4, wherein performing fusion processing on the re-processing results of the multiple intermediate prediction results to obtain fusion information comprises:
    performing superposition processing on the re-processing results of the multiple intermediate prediction results to obtain fusion information.

6. The method according to claim 4, wherein the multiple intermediate prediction results comprise a first intermediate prediction result and second intermediate prediction results, wherein the first intermediate prediction result has the highest correlation degree with the target prediction result; and
    performing fusion processing on the re-processing results of the multiple intermediate prediction results to obtain fusion information comprises:
    processing the re-processing results of the second intermediate prediction results to obtain reference results; and performing superposition processing on the re-processing result of the first intermediate prediction result and the reference results to obtain fusion information for the target prediction results; or
    determining an attention coefficient according to the re-processing result of the first intermediate prediction result, wherein the attention coefficient is a reference coefficient determined according to an attention mechanism; processing the re-processing results of the second intermediate prediction results to obtain reference results performing dot product processing on the reference results and the attention coefficient to obtain attention content; and performing superposition processing on the re-processing result of the first intermediate prediction result and the attention content to obtain fusion information for the target prediction results.

7. The method according to claim 1, wherein determining multiple target prediction results for the to-be-predicted object according to the fusion information comprises:
    determining fusion information for multiple target prediction results;
    processing the fusion information to obtain target features; and
    determining the multiple target prediction results according to the target features.

8. The method according to claim 1, wherein the neural network is trained with a to-be-predicted object,
    the steps for training the neural network with the to-be-predicted object comprise:
    inputting the to-be-predicted object into a feature extraction network in the neural network for feature extraction processing to obtain feature information of the to-be-predicted object;
    determining multiple intermediate prediction results for the to-be-predicted object by inputting the feature information into a first prediction network in the neural network for processing;
    inputting the intermediate prediction results into a fusion network in the neural network for fusion processing to obtain fusion information;
    determining multiple target prediction results for the to-be-predicted object by inputting the fusion information into multiple second prediction networks in the neural network for processing respectively;
    determining a model loss of the neural network according to the multiple intermediate prediction results, annotation information of the multiple intermediate prediction results, the multiple target prediction results, and annotation information of the multiple target prediction results; and
    adjusting a network parameter value of the neural network according to the model loss.

9. The method according to claim 8, wherein the steps for training the neural network with the to-be-predicted object further comprise:
    determining the annotation information of the multiple target prediction results before inputting the to-be-predicted object into the feature extraction network in the neural network for feature extraction processing to obtain the feature information of the to-be-predicted object; and
    determining the annotation information of the multiple intermediate prediction results according to the annotation information of the multiple target prediction results.

10. The method according to claim 1, wherein determining multiple intermediate prediction results for the to-be-predicted object according to the feature information comprises:
- determining a depth estimation intermediate prediction result, a curved surface normal intermediate prediction result, a contour intermediate prediction result, and a semantic segmentation intermediate prediction result for the to-be-predicted object according to the feature information;
- performing fusion processing on the multiple intermediate prediction results to obtain fusion information comprises:
- performing fusion processing on the depth estimation intermediate prediction result, the curved surface normal intermediate prediction result, the contour intermediate prediction result, and the semantic segmentation intermediate prediction result to obtain fusion information; and
- determining multiple target prediction results for the to-be-predicted object according to the fusion information comprises:
- determining a depth estimation result and a scene segmentation result for the to-be-predicted object according to the fusion information.

11. An object prediction apparatus, applied to a neural network and comprising:
- a processor; and
- a memory configured to store processor-executable instructions that, when executed by the processor, cause the processor to:
- perform feature extraction processing on a to-be-predicted object to obtain feature information of the to-be-predicted object;
- determine multiple intermediate prediction results for the to-be-predicted object according to the feature information;
- perform fusion processing on the multiple intermediate prediction results to obtain fusion information; and
- determine multiple target prediction results for the to-be-predicted object according to the fusion information.

12. The apparatus according to claim 11, wherein performing feature extraction processing on the to-be-predicted object to obtain feature information of the to-be-predicted object comprises:
- performing feature extraction processing on a to-be-predicted object to obtain multiple levels of features; and
- performing aggregation processing on the multiple levels of features to obtain feature information of the to-be-predicted object.

13. The apparatus according to claim 11, wherein determining multiple intermediate prediction results for the to-be-predicted object according to the feature information comprises:
- reconstructing the feature information to obtain multiple reconstitution features; and
- determining multiple intermediate prediction results for the to-be-predicted object according to the multiple reconstitution features.

14. The apparatus according to claim 11, wherein performing fusion processing on the multiple intermediate prediction results to obtain fusion information comprises:
- re-processing the multiple intermediate prediction results to obtain re-processing results of the multiple intermediate prediction results; and
- performing fusion processing on the re-processing results of the multiple intermediate prediction results to obtain fusion information.

15. The apparatus according to claim 14, wherein performing fusion processing on the re-processing results of the multiple intermediate prediction results to obtain fusion information comprises:
- performing superposition processing on the re-processing results of the multiple intermediate prediction results to obtain fusion information.

16. The apparatus according to claim 14, wherein the multiple intermediate prediction results comprise a first intermediate prediction result and second intermediate prediction results, wherein the first intermediate prediction result has the highest correlation degree with the target prediction result; and
- performing fusion processing on the re-processing results of the multiple intermediate prediction results to obtain fusion information comprises:
- processing the re-processing results of the second intermediate prediction results to obtain reference results; and performing superposition processing on the re-processing result of the first intermediate prediction result and the reference results to obtain fusion information for the target prediction results; or
- determining an attention coefficient according to the re-processing result of the first intermediate prediction result, wherein the attention coefficient is a reference coefficient determined according to an attention mechanism; processing the re-processing results of the second intermediate prediction results to obtain reference results performing dot product processing on the reference results and the attention coefficient to obtain attention content; and performing superposition processing on the re-processing result of the first intermediate prediction result and the attention content to obtain fusion information for the target prediction results.

17. The apparatus according to claim 11, wherein determining multiple target prediction results for the to-be-predicted object according to the fusion information comprises:
- determining fusion information for multiple target prediction results;
- processing the fusion information to obtain target features; and
- determining the multiple target prediction results according to the target features.

18. The apparatus according to claim 11, wherein the neural network is trained with a to-be-predicted object,
- the processor is further caused to:
- input the to-be-predicted object into a feature extraction network in the neural network for feature extraction processing to obtain feature information of the to-be-predicted object;
- determine multiple intermediate prediction results for the to-be-predicted object by inputting the feature information into a first prediction network in the neural network for processing, and;
- input the intermediate prediction results into a fusion network in the neural network for fusion processing to obtain the fusion information;
- determine multiple target prediction results for the to-be-predicted object by inputting the fusion information into multiple second prediction networks in the neural network for processing respectively;

determine a model loss of the neural network according to the multiple intermediate prediction results, annotation information of the multiple intermediate prediction results, the multiple target prediction results, and annotation information of the multiple target prediction results; and adjust a network parameter value of the neural network according to the model loss.

19. The apparatus according to claim 18, wherein the processor is further caused to:

determine the annotation information of the multiple target prediction results before inputting the to-be-predicted object into the feature extraction network in the neural network for feature extraction processing to obtain the feature information of the to-be-predicted object; and determine the annotation information of the multiple intermediate prediction results according to the annotation information of the multiple target prediction results.

20. A non-transitory computer readable storage medium having computer program instructions stored thereon, wherein when the computer program instructions are executed by a processor, the processor is caused to implement an object prediction method, applied to a neural network and comprising:

performing feature extraction processing on a to-be-predicted object to obtain feature information of the to-be-predicted object;

determining multiple intermediate prediction results for the to-be-predicted object according to the feature information;

performing fusion processing on the multiple intermediate prediction results to obtain fusion information; and determining multiple target prediction results for the to-be-predicted object according to the fusion information.

* * * * *